(12) United States Patent
Larsen

(10) Patent No.: US 12,434,839 B1
(45) Date of Patent: Oct. 7, 2025

(54) LOADER VEHICLE LOCKING DEVICE AND METHOD OF USING

(71) Applicant: Government of the United States, as represented by the Secretary of the Air Force, Wright-Patterson AFB, OH (US)

(72) Inventor: Stephen Larsen, JB Andrews, MD (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 393 days.

(21) Appl. No.: 18/333,638

(22) Filed: Jun. 13, 2023

(51) Int. Cl.
*B64D 9/00* (2006.01)

(52) U.S. Cl.
CPC .................................. *B64D 9/003* (2013.01)

(58) Field of Classification Search
CPC ..... B64D 9/00; B64D 9/003; B64D 2009/006
USPC .......................................................... 410/77
See application file for complete search history.

(56) References Cited

U.S. PATENT DOCUMENTS

| | | | |
|---|---|---|---|
| 3,282,550 A | 11/1966 | Warren | |
| 3,377,040 A | 4/1968 | Hansen | |
| 3,399,921 A | 9/1968 | Trost et al. | |
| 3,800,713 A | 4/1974 | Nordstrom | |
| 3,810,534 A | 5/1974 | Prete, Jr. | |
| 4,317,645 A | 3/1982 | Van Gompel | |
| 4,515,506 A | 5/1985 | Van Gompel et al. | |
| 4,662,503 A | 5/1987 | Lycke | |
| 6,193,453 B1 | 2/2001 | Kernkamp | |
| 7,517,180 B2 | 4/2009 | Baker | |
| 10,059,571 B2 | 8/2018 | Scheer | |
| 2004/0018067 A1* | 1/2004 | Taylor | B65D 88/14 410/46 |
| 2011/0176903 A1* | 7/2011 | Schulze | B64D 9/003 414/800 |
| 2020/0140089 A1* | 5/2020 | Kismarton | B64C 1/22 |
| 2021/0354828 A1* | 11/2021 | Nuessen | B64D 9/003 |
| 2025/0263168 A1* | 8/2025 | Schafer | B65G 13/02 |

* cited by examiner

*Primary Examiner* — Steven O Douglas
(74) *Attorney, Agent, or Firm* — AFMCLO/JAZ; Larry L. Huston

(57) ABSTRACT

A locking device for securing a 463L pallet and cargo to the floor of an aircraft. The pallet has protrusions extending outwardly and generally parallel to the floor. The aircraft also have a longitudinally extending rails with spaced rail locks which are manually insertable and retractable. The locking device has opposed edges with recesses on one edge and notches on the opposed edge. The recesses are sized and spaced to receive the pallet protrusions while the opposed notches receive the insertable rail locks. The locking device is generally planar and may have not moving parts for simplicity.

20 Claims, 8 Drawing Sheets

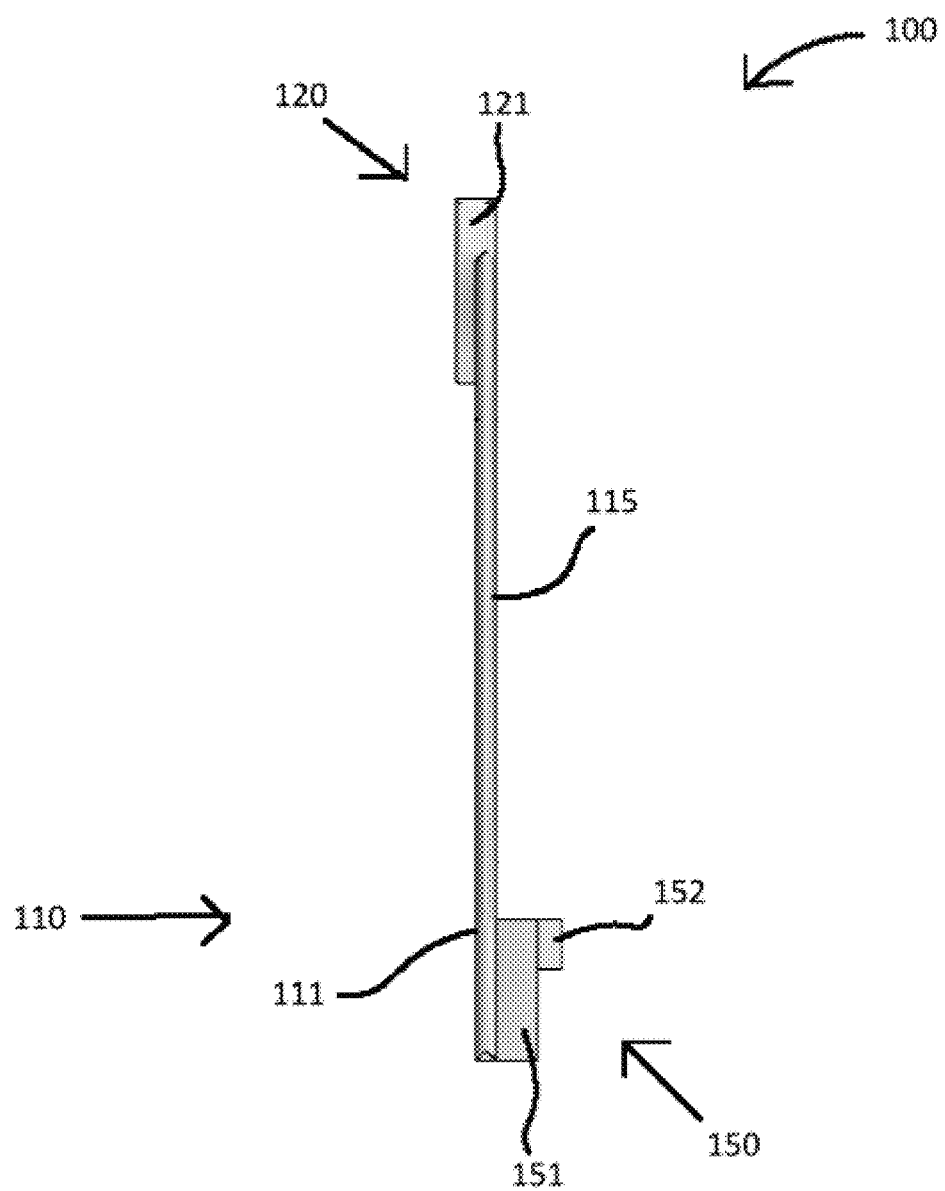

LOADER VEHICLE LOCKING DEVICE AND METHOD OF USING

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a generally planar locking device for holding an aircraft pallet in position and more particularly to such a locking device which has no moving parts.

BACKGROUND OF THE INVENTION

Standardized pallets include the 463L master pallet developed in 1959 by the Douglas Aircraft Company and contracted to AAR Cadillac Manufacturing Corporation for manufacturing. The master pallet (also known as a HCU-6/E pallet 20) complies with MIL-STD-1791 and can be turned sideways to fit on the rollers of C-130 and C-141 aircraft 22 and can be turned lengthwise to fit on the bed of a truck. Such pallets are inventoried at four DoD Pallet and Net Distribution Centers per Defense Transportation Regulation-Part VI, Chapter 608 (19 Jan. 2023), incorporated herein by reference. Chapter 608.G.1 prohibits the use of 463L pallets for any purpose other than pre-palletizing and transporting cargo 250 for airlift. Aircraft pallet capacities range from six pallets in a C-130 to 35 pallets in a C-5.

The 463L master pallet is rectangular, 88 inches (220 cm) wide, 108 inches (270 cm) long, and 2¼ inches (5.7 cm) high. The usable space is 84 by 104 in (210 by 260 cm) with 2 inches (5 cm) per side to secure the straps, nets, or chains. The 463L master pallet has an aluminum rail 24P on all four sides, encasing a balsa wood core. A large 463L pallet can hold up to 10,000 lbs (4,500 kg) of cargo 250, not exceeding 250 lbs per square inch (17 kg per square cm). Empty, each pallet weighs 290 pounds (130 kg) or 355 pounds (160 kg) with two side nets and a top net. The pallet has 22 tie down rings and registered indents 24I for use with one or more nets or connectors. The tie down rings/indents are disposed with five spaced apart tie down rings/indents on each of the shorter side and six spaced apart tie down rings/indents on each of the longer sides. Each tie down ring has a capacity of 7500 lbs (3400 kg). Based on the HCU-6/E air cargo master pallet, additional components can include the HCU-7/E side net, the HCU-15/C top net, and the CGU-1/B Device or cargo strap. MB-1 Devices or MB-2 Devices may be used with appropriate chains. The pallet may be covered with a plastic 463L pallet cover, NSN 3990-00-930-1480. The pallet and cargo 250 form no part of the claimed invention except as may be specifically claimed below.

In order to load the 463L pallet onto an appropriate aircraft, the 463L pallet is longitudinally inserted into the aircraft between two spaced apart longitudinally oriented rails. The rails have opposed rail locks which are stationary and cannot move along the rails. However, each rail lock can be laterally inserted and retracted a short distance as helpful to secure the cargo 250.

Each pallet is secured using the "Patriot Method" or rotating the 463L pallet into a Logistics Delivery System (LGS) configuration. The Patriot Method requires numerous straps or chains that are tied together and overlapped to ensure a tight and strong fastening of the cargo 250. This method requires up to forty-five minutes with one person or nearly thirty minutes with three people, to complete a single pallet tiedown to the longitudinal rails.

Of course if the pallets are not properly secured, problems arise. For example, cargo 250 can be damaged if the pallets move or are jostled during flight. If the pallets move too far the load/balance calculations of the aircraft can be adversely affected and flight safet jeopardized. Accordingly, it is necessary that 463L pallets be properly secured for transport, even when inexperienced personnel are the loaders.

While the C-17 is the only aircraft that carries 463L pallets in the LGS configuration on a regular basis, other aircraft do occasionally fly in the LGS configuration. For example when the C-5 or C-130 travel in the LGS configuration, chains and straps are again required for securing the cargo 250 pallets to the aircrafts. And the time penalty occurs again.

Since 1959 it can be seen that there has been a longstanding need for a way to secure 463L pallets in place during transport on aircraft. There is further a longstanding need to secure 463L pallets without expensive modification to infrastructure of the aircraft. There is further a longstanding need to secure 463L pallets without expensive or time consuming equipment and processes. There is further a longstanding need to quickly secure 463L pallets without requiring highly experienced or particularly specialized loaders. The longstanding needs, and more, are addressed by the invention claimed herein.

SUMMARY OF THE INVENTION

In one embodiment the invention comprises a locking device for securing a 463L pallet to an aircraft. The locking device comprises a generally planar main body having a first face and a second face opposed thereto, at least two recesses in the first face of the main body and spaced apart on a predetermined recess pitch and adapted to removably receive at least two respective outwardly extending protrusions of a 463L pallet therein and at least two notches through the main body and spaced apart on a predetermined notch pitch GP and adapted to removably receive at least two respective rail locks therein, the at least two respective rail locks being held in fixed position on an a longitudinally oriented rail of an aircraft.

In another embodiment the invention comprises a method of securing a 463L pallet having outwardly extending protrusions onto a floor surface of an aircraft having a rail rigidly fixed thereto. The method comprises the steps of disposing a 463L pallet on the floor surface of a cargo aircraft in operable relationship with a plurality of rail locks disposed on the rail with a fixed and predetermined pitch, providing a locking device having a main body with a first side and a second side opposed thereto, the main body having at least two recesses juxtaposed with the first side of the main body and being spaced apart on a predetermined recess pitch and having at least two rail receiving notches juxtaposed with the second side of the main body and being spaced apart on a predetermined notch pitch, inserting at least two outwardly extending protrusions of the 463L pallet into corresponding at least two recesses of the locking device, disposing the locking device in a position substantially parallel to the floor of the aircraft and inserting at least two rail locks into corresponding at least two receiving notches to thereby substantially immobilize the 463L pallet relative to the rail.

BRIEF DESCRIPTION OF THE DRAWINGS

FIG. 4 is a scale side elevational view of the locking device of FIG. 1.

DETAILED DESCRIPTION OF THE INVENTION

Figure 1:
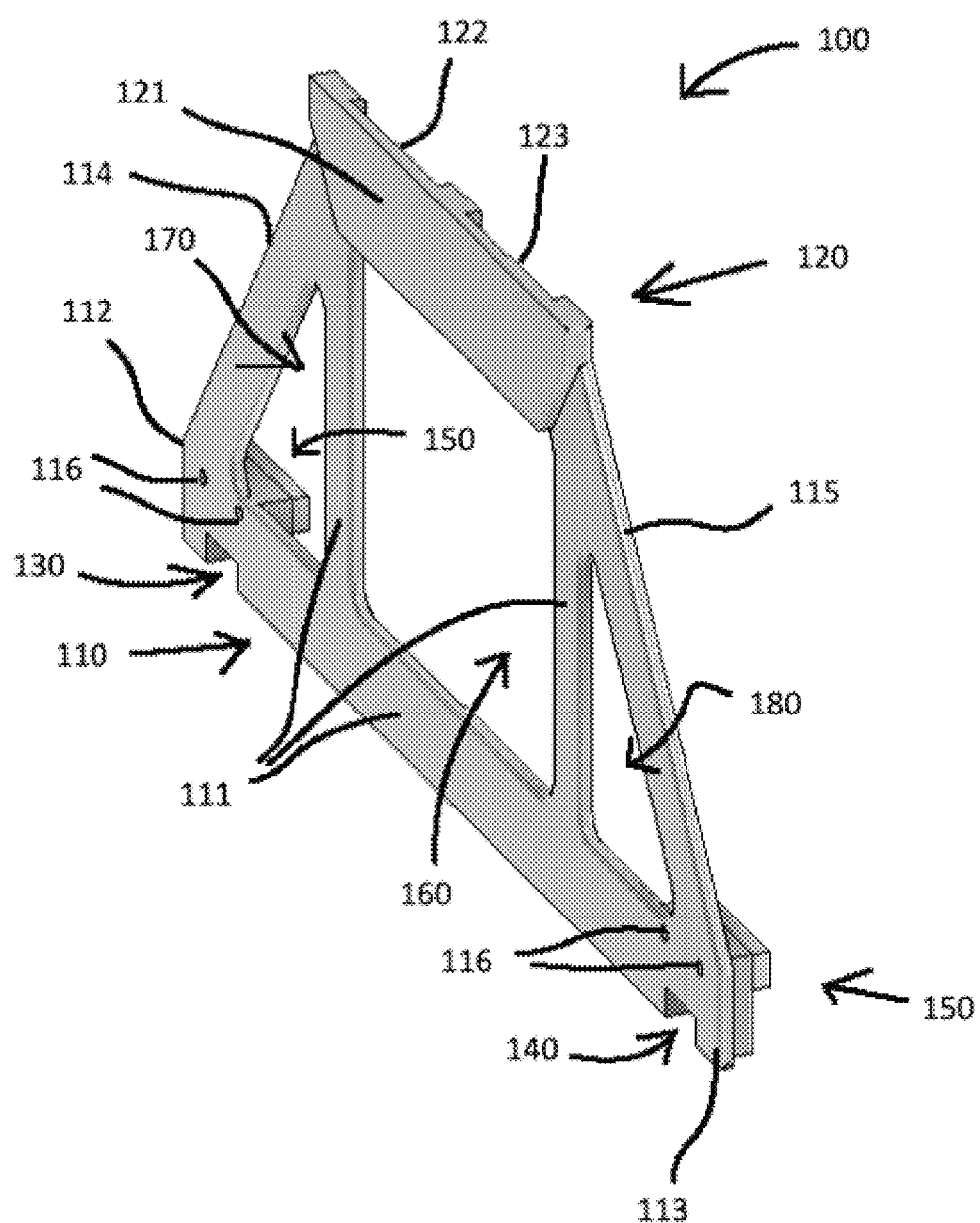
FIG. 1 is a scale perspective view of a locking device according to the present invention.

Referring to FIG. 1, The locking device 100 according to the present invention may include a main body 110, a pallet connector 120, a first rail receiving notch 130, a second rail receiving notch 140, a plurality of support members 150, a central aperture 160, a first side aperture 170, and a second side aperture 180, but is not limited thereto.

The locking device 100 is generally planar although recesses 122, 123, support bodies 151 and bumpers 152 may be included as reasonable without deviation from general planarity. The generally planar form factor provides the benefit of space savings, convenient storage when not in use and being unobtrusive while deployed on an aircraft.

The locking device 100 is shown as being integral, although one of skill will understand the main body 110 may comprise separable parts rigidly joinable together for convenience. The locking device 100 may be made of welded aluminum, steel, rigid plastic, wood and combinations thereof. Aluminum stock having a thickness of 0.5 inches has been found suitable. While a trapezoidal shape is shown, one will recognize the invention is not so limited.

Figure 2:
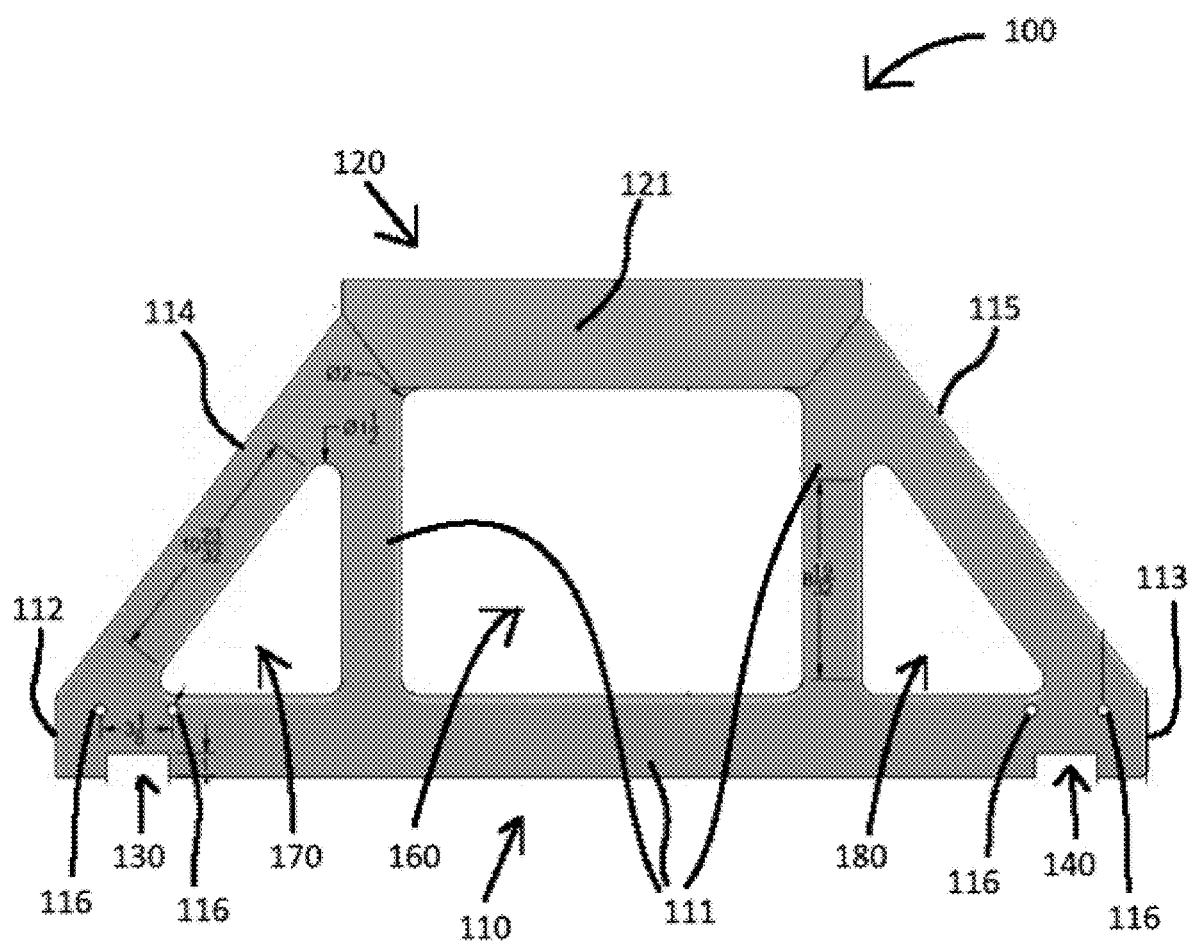
FIG. 2 is a scale frontal view of the locking device of FIG. 1.
Figure 3:
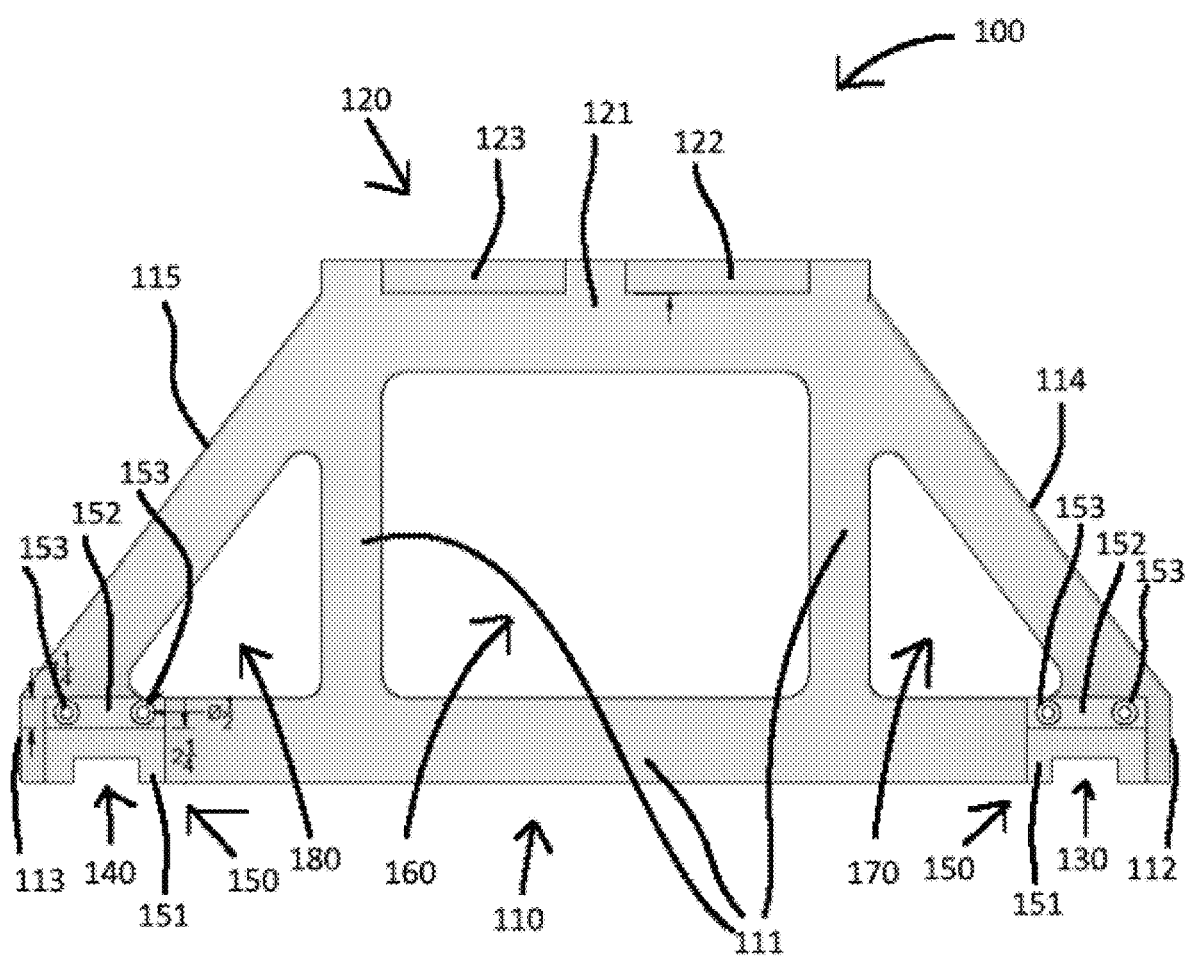
FIG. 3 is a scale rear view of the locking device of FIG. 1.

Referring to FIG. 2 and FIG. 3, the locking device may be symmetric about an axis (vertical as shown in these figures) or may be asymmetric so long as the pitches described herein are honored. The pitches are shown to be horizontal in these figures, parallel to the longitudinal axis of the aircraft. Also the transverse dimensions must be honored and are shown to be vertical in these figures.

The loader vehicle locking device 100 may include a main body 110, a pallet connector 120, a first rail receiving notch 130, a second rail receiving notch 140, a plurality of support members 150, a central aperture 160, a first side aperture 170, and a second side aperture 180, but is not limited thereto. The main body 110 may include a frame 111, a first corner 112, a second corner 113, a first angled side 114, a second angled side 115, and a plurality of fastener receiving apertures 116, but is not limited thereto.

The first corner 112 may be disposed at a first end of the frame 111. The first corner 112 may form a first boundary at the first end of the frame 111. The second corner 113 may be disposed at a second end of the frame 111 opposite with respect to the first end of the frame 111. The second corner 113 may form a second boundary at the second end of the frame 111.

The first angled side 114 may be angularly disposed at a first end away from the first corner 112. For example, the first angled side 114 may be angularly disposed toward a center of the frame 111. The second angled side 115 may be angularly disposed at a first end away from the second corner 113. For example, the second angled side 115 may be angularly disposed toward the center of the frame 111. Thus, the first angled side 114 and/or the second angled side 115 may be oriented in acute angular relationship.

The plurality of fastener receiving apertures 116 may be juxtaposed on at least a portion of the first corner 112 and/or at least a portion of the second corner 113. Each of the plurality of fastener receiving apertures 116 may receive a fastener therein.

The pallet connector 120 may include a connector body 121, a first pallet receiving recess 122, and a second pallet receiving recess 123, but is not limited thereto. The connector body 121 may be juxtaposed on at least a portion of the frame 111. More specifically, the connector body 121 may be disposed at a first end on a second end of the first angled side 114. Also, the connector body 121 may be disposed at a second end on a second end of the second angled side 115. Accordingly, the connector body 121 may connect the first angled side 114 to the second angled side 115.

The connector body 121 having recesses 122, 123 therein may be disposed on a first side of the main body 110. The frame 111 may have the notches 130, 140 therein disposed on a second side of the main body 110. The first side and second side of the main body may be oppositely disposed across the locking device 100.

Collectively, the frame 111, the first angled side 114, the second angled side 115, and/or the connector body 121 may form the trapezoidal shape. The first angled side 114 and/or the second angled side 115 may reinforce and/or increase a stability level of the frame 111 and/or the connector body 121 and/or an entirety of the structure. Thus, the trapezoidal shape may provide a highly durable and stable structure, such that the frame 111 and/or the connector body 121 may stabilize the 463L pallet 10 in response to an application of force (e.g., pushing, pulling) thereto by directing the force toward a center of the frame 111 and/or the connector body 121.

The central aperture 160 may be disposed at a center of the frame 111. Moreover, the central aperture 160 may have the connector body 121 disposed on at least a portion of a perimeter of the central aperture 160.

The first side aperture 170 may be disposed on at least a portion of a first side of the frame 111. The frame 111, the first corner 112, the connector body 121, and/or the central aperture 160 may form a perimeter around the first side aperture 170. Also, the first side aperture 170 may be separated from the central aperture 160 by a first portion of the frame 111.

The second side aperture 180 may be disposed on at least a portion of a second side of the frame 111 opposite with respect to the first side of the frame 111. The frame 111, the second corner 113, the connector body 121, and/or the central aperture 160 may form a perimeter around the second side aperture 180. Also, the second side aperture 180 may be separated from the central aperture 160 by a second portion of the frame 111. Accordingly, the central aperture 160 may be disposed between the first side aperture 170 and/or the second side aperture 180.

The first pallet receiving recess 122 may be disposed on at least a portion of the connector body 121. The first pallet receiving recess 122 may be recessed with respect to an outer surface of the connector body 121. Therefore, the first pallet receiving recess 122 may receive at least one first protrusion 12 of the 463L pallet 10 therein.

The second pallet receiving recess 123 may be disposed on at least a portion of the connector body 121. The second pallet receiving recess 123 may be recessed with respect to the outer surface of the connector body 121. Therefore, the second pallet receiving recess 123 may receive at least one second protrusion 12 of the 463L pallet 10 therein. Moreover, the second pallet receiving recess 123 may be distanced from the first pallet receiving recess 122 corresponding to a distance of the at least one first protrusion 12 of the 463L pallet 10 to the at least one second protrusion 12 of the 463L pallet 10.

The first pallet receiving recess 122 and/or the second pallet receiving recess 123 may be specifically sized (i.e., a length, a width, a depth, a pitch) corresponding to a size (i.e., a length, a width, a depth, a pitch) of the at least one first protrusion 12 of the 463L pallet 10 and/or the at least one second protrusion 12 of the 463L pallet 10, respectively. The first pallet receiving recess 122 and/or the second pallet receiving recess 123 may be only slightly greater in size than the size of the at least one first protrusion 12 of the 463L pallet 10 and/or the at least one second protrusion 12 of the 463L pallet 10, respectively. As such, the first pallet receiving recess 122 and/or the second pallet receiving recess 123 may snugly fit the at least one first protrusion 12 of the 463L pallet 10 and/or the at least one second protrusion 12 of the 463L pallet 10, respectively. Accordingly, the first pallet receiving recess 122 and/or the second pallet receiving recess 123 may prevent movement (e.g., sliding) of the 463L pallet 10 while the first pallet receiving recess 122 and/or the second pallet receiving recess 123 remain connected to the 463L pallet 10.

The first rail receiving notch 130 may be disposed on at least a portion of the first corner 112. The first rail receiving notch 130 may receive at least one of a plurality of rail locks 20 therein. In other words, at least one of the plurality of rail locks 20 may detachably connect (i.e., insert within) the first rail receiving notch 130.

The second rail receiving notch 140 may be disposed on at least a portion of the second corner 113. The second rail receiving notch 140 may receive at least one of the plurality of rail locks 20 therein. In other words, at least one of the plurality of rail locks 20 may detachably connect (i.e., insert within) the second rail receiving notch 140.

Also, the first rail receiving notch 130 and/or the second rail receiving notch 140 may be specifically sized (i.e., a length, a width, a depth, a pitch) corresponding to a size (i.e., a length, a width, a depth) of each of the plurality of rail locks 20. Accordingly, the first rail receiving notch 130 and/or the second rail receiving notch 140 may prevent movement (e.g., sliding) of the main body 110 away from the plurality of rail locks 20. As such, the first rail receiving notch 130 and/or the second rail receiving notch 140 may snugly fit each of the plurality of rail locks 20 therein.

The main body 110 may include a frame 111, a first corner 112 disposed at a first end of the frame 111, a second corner 113 disposed at a second end of the frame 111 opposite with respect to the first end of the frame 111, a first angled side 114 angularly disposed at a first end away from the first corner 112, and a second angled side 115 angularly disposed at a first end away from the second corner 113.

The frame 111, the first angled side 114, the second angled side 115, and the pallet connector 120 may form a trapezoidal shape to increase a stability level in response to an application of force thereto.

The pallet connector 120 may include a connector body 121, a first pallet receiving recess 122 disposed on at least a portion of the connector body 121 to receive at least one first protrusion 12 of the 463L pallet 10 therein, and a second pallet receiving recess 123 disposed on at least a portion of the connector body 121 to receive at least one second protrusion 12 of the 463L pallet 10 therein.

Referring to FIG. 4, each of the plurality of support members 150 may include a support body 151, a bumper 152, and a plurality of fasteners 153, but is not limited thereto. The support body 151 may be juxtaposed with or disposed on at least a portion of the first corner 112 and/or the second corner 113. The support body 151 may be shaped to border the first rail receiving notch 130 and/or the second rail receiving notch 140 on at least three sides thereof. The support body 151 may be disposed around a perimeter of the first rail receiving notch 130 and/or a perimeter of the second rail receiving notch 140. The support body 151 may elevate the first corner 112 and/o the second corner 113 away from a surface (e.g., a surface of the aircraft), such that the support body 151 may prevent the first corner 112 and/or the second corner 113 from contact with the surface.

The bumper 152 may be constructed of a resilient material, such as rubber. The bumper 152 may be disposed on at least a portion of the support body 151. The bumper 152 may elevate the first corner 112 and/or the second corner 113 away from the surface. And the bumper 152 may prevent the support body 151 from contacting the external surface. Furthermore, the bumper 152 may facilitate movement of the main body 110 across the surface of the aircraft. For example, the bumper 152 may facilitate movement (e.g., sliding, rolling) of the main body 110 during loading of the 463L pallet 10 onto the aircraft.

Referring back to FIG. 3, a plurality of fasteners 153 may be detachably connected to bumper 152. Additionally, each of the plurality of fasteners 153 may detachably connect through the bumper 152 to at least one of the plurality of fastener receiving apertures 116. In other words, each of the plurality of fastener receiving apertures 116 may receive at least one of the plurality of fasteners 153 therein. As such, the plurality of fasteners 153 may detachably connect (i.e., fasten) the bumper 152 to the support body 151. The plurality of fasteners 153 may include a threaded fastener 117, particularly a countersunk threaded fastener 117, adhesive, etc.

The connector body 121 may be disposed at a first end on a second end of the first angled side 114 and disposed at a second end on a second end of the second angled side 115. The first pallet receiving recess 122 and the second pallet receiving recess 123 may snugly fit the at least one first protrusion 12 of the 463L pallet 10 and the at least one second protrusion 12 of the 463L pallet 10, respectively. The loader vehicle locking device 100 may further include a plurality of support members 150 disposed on at least a portion of the main body 110 to elevate the main body 110 away from an external surface. Each of the plurality of support members 150 may include a support body 151, and a bumper 152 disposed on at least a portion of the support body 151 to prevent the support body 151 from contacting the external surface. The bumper 152 may facilitate movement of the main body 110 across the external surface.

Figure 5A:
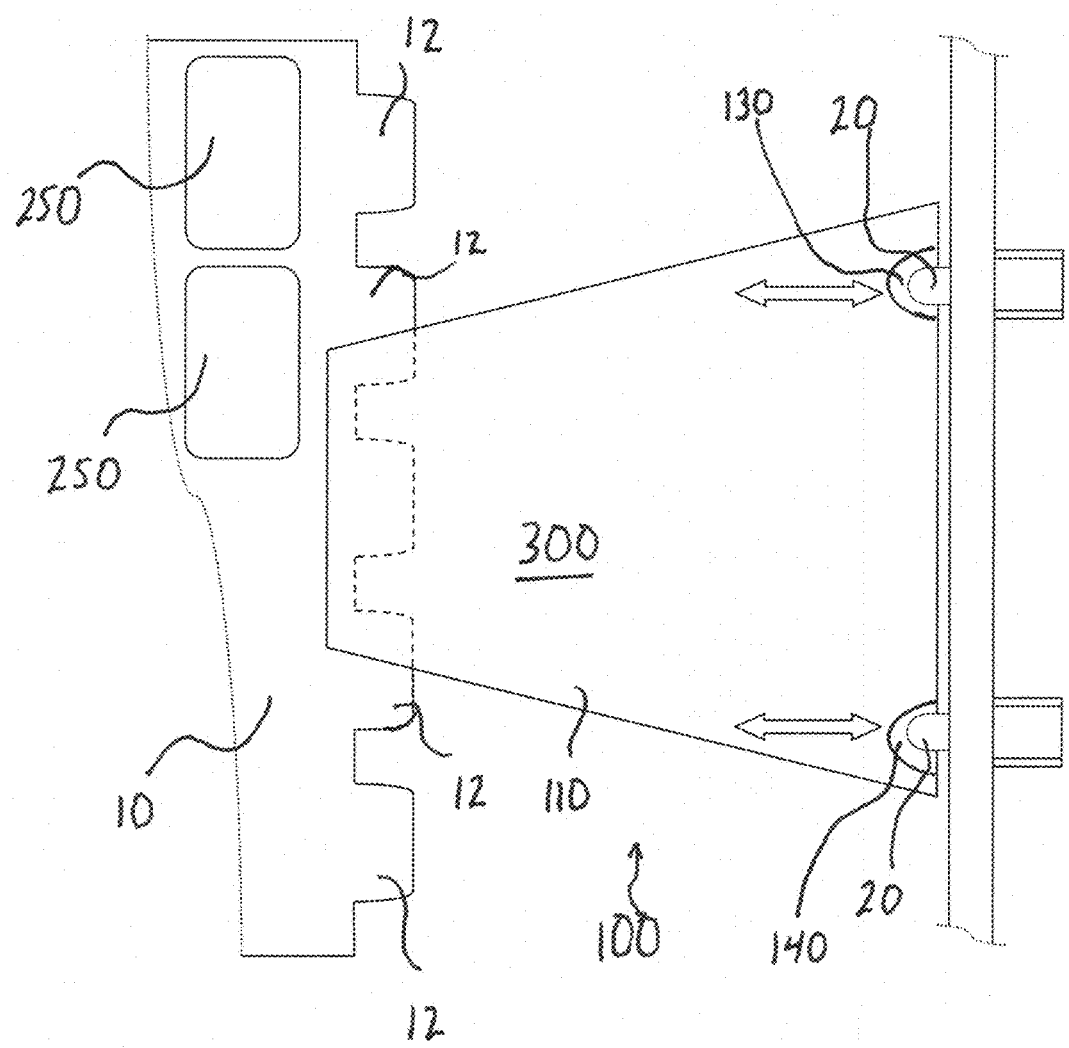
FIG. 5A is a schematic top plan view of a solid locking device in position with a fragmentary 463L pallet with the underlying portion of the 463L pallet shown in phantom and the rail locks bilaterally moving in the directions of the arrows.
Figure 5B:
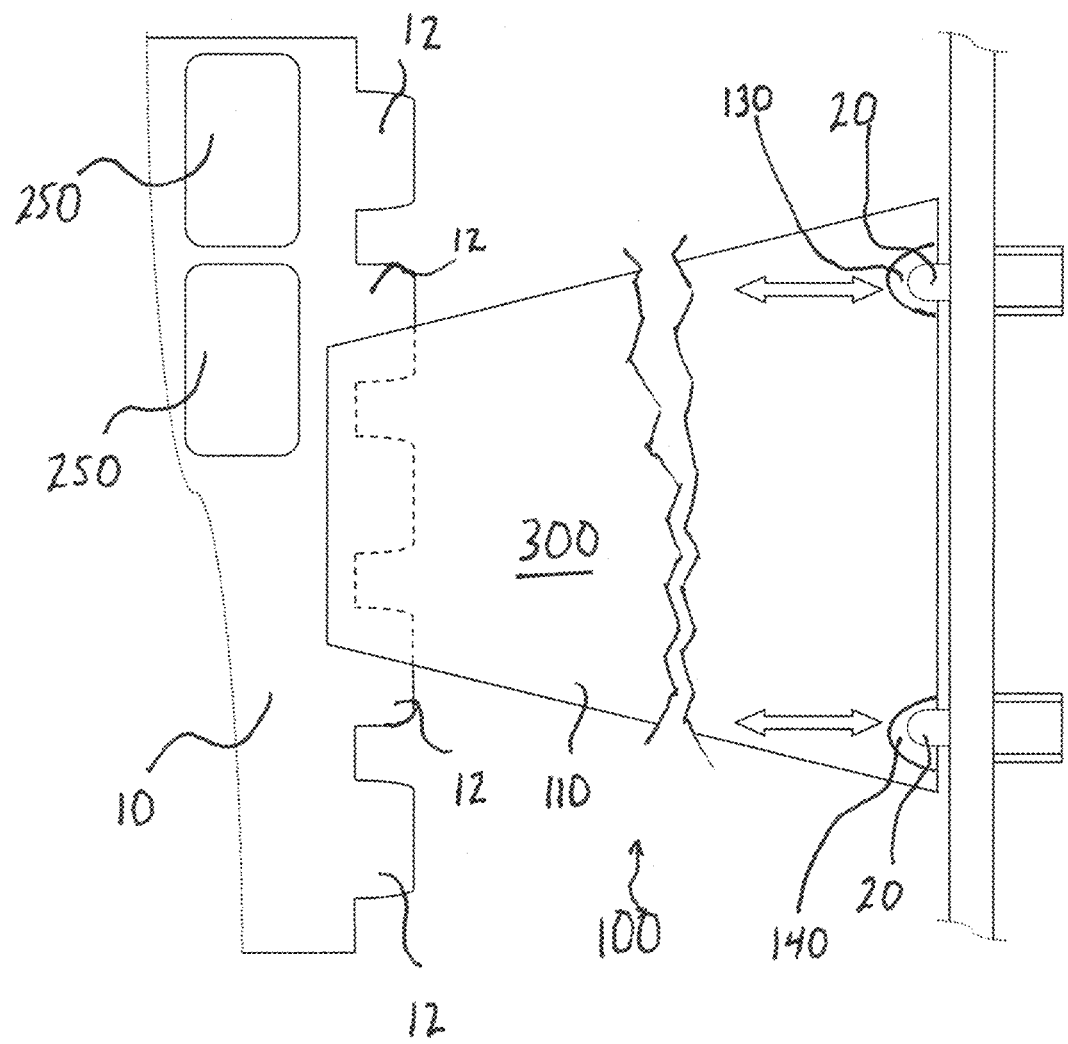
FIG. 5B is a schematic top plan view the locking device locking device of FIG. 5A having an indeterminate dimension perpendicular to the longitudinal axis of the aircraft while in use.

Referring to FIG. 5A and FIG. 5B, in use the main body 110 may be removably disposed on the floor surface of the aircraft. The main body 110 may be solid for simplicity of construction. The first pallet receiving recess 122 and/or the second pallet receiving recess 123 may be detachably connected to the at least one first protrusion 12 of the 463L pallet 10 and/or the at least one second protrusion 12 of the 463L therein. Subsequently, the first rail receiving notch 130 and/or the second rail receiving notch 140 may be aligned with the plurality of rail locks 20, such that the first rail receiving notch 130 and/or the second rail receiving notch 140 may receive the plurality of rail locks 20 therein. As such, the plurality of rail locks 20 may lock the frame 111 against the 463L pallet 10. In all embodiments, the locking device 100 may facilitate securing of the 463L pallet 10 to the loader vehicle 10 without use of chains, straps or moving parts.

Figure 6A:
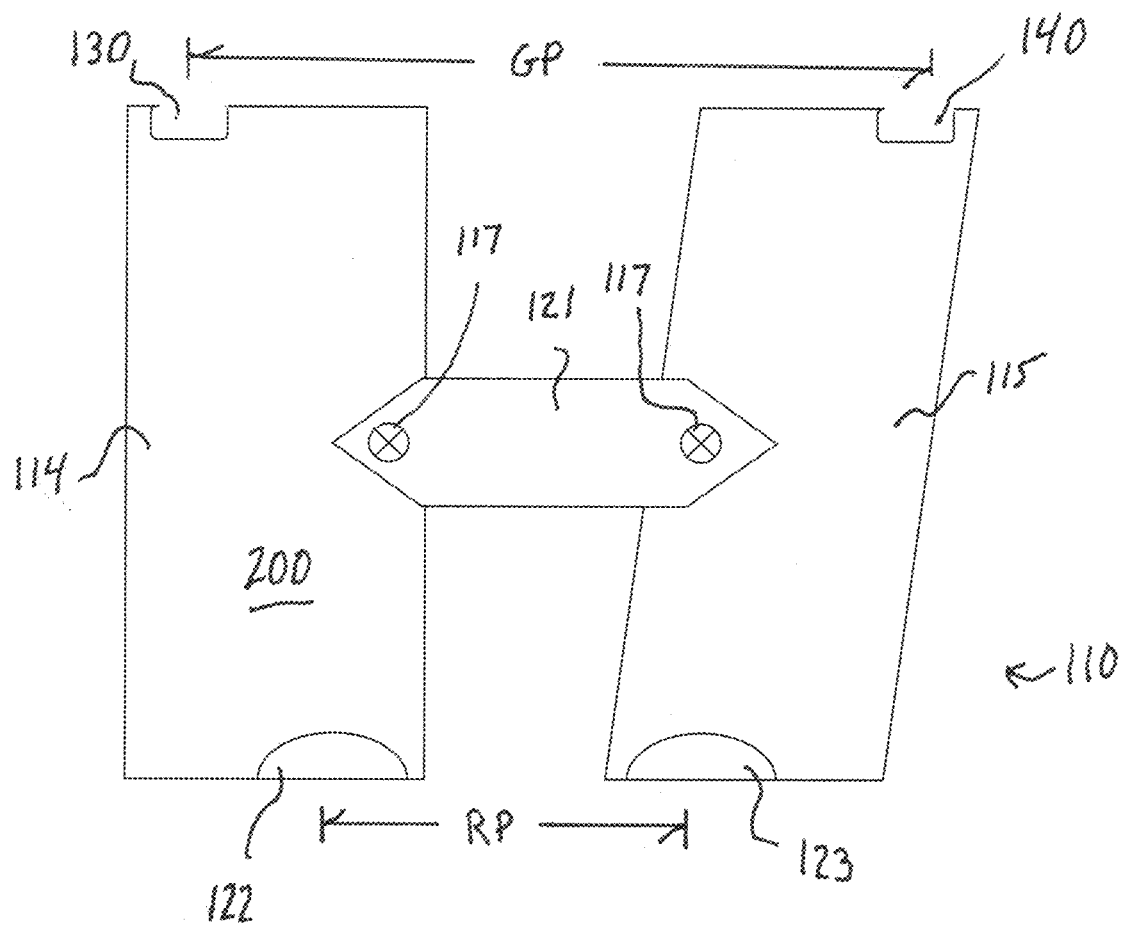
FIG. 6A is a schematic frontal view of an alternative embodiment of the present invention showing an asymmetric locking device having separable parts and the rail receiving notches shown in phantom.
Figure 6B:
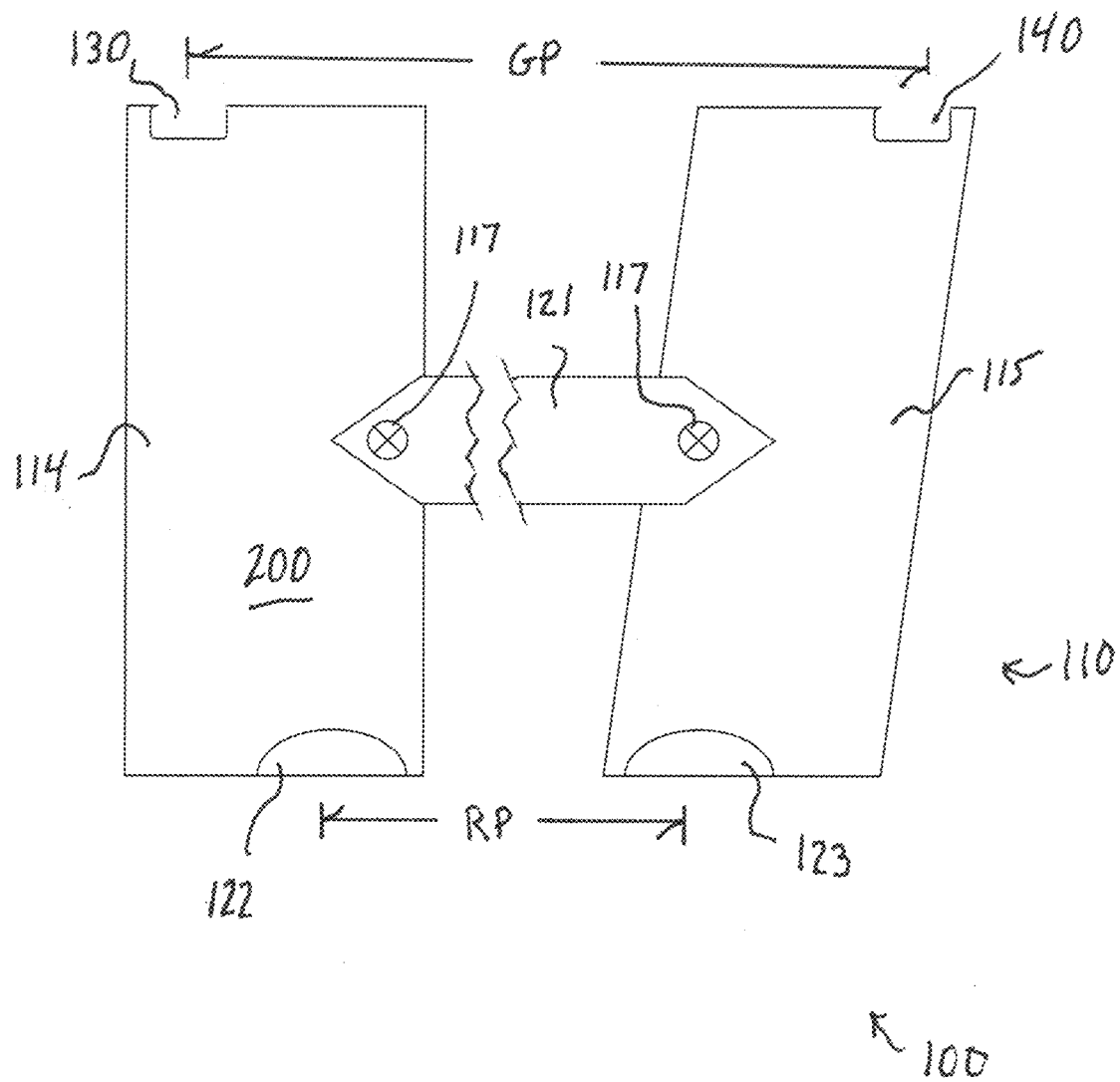
FIG. 6B is a schematic frontal view of the locking device of FIG. 6A having an indeterminate pitch.

Referring to FIG. 6A and FIG. 6B, in an alternative embodiment, rather than a symmetrical trapezoid, the main body 110 may resemble a 'H' shape, and more particularly an asymmetric 'H' shape. The asymmetry provides greater flexibility in securing parts for the main body 110, as possible scraps may be used and removably held together via threaded fasteners 117 and particularly countersunk threaded fasteners 117 as shown. This embodiment has first and second angled sides 114, 115 joined by connector body 121.

The embodiment of FIG. 6A and FIG. 6B has the benefit that the connector body 121 may be swapped out for another connector body 121 having a different length in the horizontal direction as shown in the figure. This arrangement provides flexibility for the locking device 100 to accommodate different recess pitches RP and different notch pitches GP.

While an embodiment having two angled sides 114, 115 and a single connector body 121 is shown, one of skill will recognize the invention is not so limited. Any reasonable number of angles sides 114, 115, etc. may be joined by corresponding connector bodies 121. This arrangement provides the benefit that more than two recesses 122, 123, etc. and more than two notches 130, 140, etc. may be utilized. One of skill will recognize that the number of recesses 122, 123, etc. and number of notches 130, 140, etc. may be equal or unequal.

The frame 111 and main body 110 has a first face 200 and a second face 300 opposed thereto. The recesses 122, 123 may be depressed into the first face 200. The recesses 122, 123 may be thinned areas of connector body 121 or connector body 121 may be connected towards the second face 300. The support body 151 and optional bumper 152 may extend outwardly from the first face and plane of the locking device 100.

In all embodiments, to correspond to the spacing of the pallet protrusions 12 the recesses 122, 123 may be disposed on a recess pitch RP of 20+/−0.1 inches and have a recess depth of 1.58+/−0.1 inches. In all embodiments, to correspond to the spacing of the rail locks 20 the first rail receiving notch 130 and the second rail receiving notch 140 may be disposed on a notch pitch of 45.1+/−0.2 inches and have a notch depth of 1+/−0.1 inches. The aforementioned recess pitch RP and notch pitch GP are important to properly receiving the protrusions 12 of the pallet 10 therein and rail locks 20 of the aircraft therein, respectively.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range for the same parameter, and vice versa. As used herein, when two components are joined or connected the components may be interchangeably contiguously joined together or connected with an intervening element therebetween. A component joined to the distal end of another component may be juxtaposed with or joined at the distal end thereof. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A loader vehicle locking device detachably connected to a 463L pallet having a plurality of protrusions extending outwardly therefrom, the loader vehicle locking device comprising:
   a main body having a first side and a second side opposed thereto;
   at least two recesses juxtaposed with the first side of the main body, spaced apart on a predetermined recess pitch and removably receiving at least two respective outwardly extending protrusions of a 463L pallet therein; and
   at least two rail receiving notches juxtaposed with the second side of the main body, spaced apart on a predetermined notch pitch and removably receiving at least two respective rail locks therein, the at least two respective rail locks being held in fixed position on an aircraft.

2. The loader vehicle locking device of claim 1, wherein the main body is generally planar.

3. The loader vehicle locking device of claim 1, wherein the main body is generally symmetric about an axis lying within the plane of the main frame.

4. The loader vehicle locking device of claim 2, wherein the recess pitch is 20+/−0.1 inches.

5. The loader vehicle locking device of claim 3, wherein the notch pitch is 45.1+/−0.2 inches.

6. The loader vehicle locking device of claim 2, wherein the main body has a trapezoidal shape with at least one aperture therethrough.

7. The loader vehicle locking device of claim 2, wherein the main body has a 'H' shape.

8. A locking device for securing a 463L pallet to an aircraft, the locking device comprising:

a generally planar main body having a first face and a second face opposed thereto;

at least two recesses in the first face of the main body and spaced apart on a predetermined recess pitch and adapted to removably receive at least two respective outwardly extending protrusions of a 463L pallet therein; and at least two notches through the main body and spaced apart on a predetermined notch pitch and adapted to removably receive at least two respective rail locks therein, the at least two respective rail locks being held in fixed position on an a longitudinally oriented rail of an aircraft.

9. The locking device of claim 8 having no moving parts.

10. The locking device of claim 9 wherein the generally planar main body comprises joinable parts separably and rigidly joined together.

11. The locking device of claim 10 wherein the generally planar main body comprises joinable parts separably and rigidly joined together using threaded fasteners.

12. The locking device of claim 9 further comprising a support body juxtaposed with each of the at least two notches and extending outwardly from the second face of the main body.

13. The locking device of claim 11 wherein the at least two notches intercept a single edge of the main body each support body is shaped to border the respective notch juxtaposed therewith.

14. The locking device of claim 9 wherein the generally planar main body is symmetric about an axis lying within the plane thereof.

15. A method of securing a 463L pallet having outwardly extending protrusions onto a floor surface of an aircraft having a rail rigidly fixed thereto, the method comprising the steps of:

providing a 463L pallet on the floor surface of a cargo aircraft in operable relationship with a plurality of rail locks disposed on the rail with a fixed and predetermined pitch;

providing a locking device having a main body with a first side and a second side opposed thereto, the main body having at least two recesses juxtaposed with the first side of the main body and being spaced apart on a predetermined recess pitch and having at least two rail receiving notches juxtaposed with the second side of the main body and being spaced apart on a predetermined notch pitch;

inserting at least two outwardly extending protrusions of the 463L pallet into corresponding at least two recesses of the locking device;

disposing the locking device in a position substantially parallel to the floor of the aircraft; and inserting at least two rail locks into corresponding at least two receiving notches to thereby substantially immobilize the 463L pallet relative to the rail.

16. A method according to claim 15 further comprising the step of assembling the locking device from separable parts before inserting the at least two outwardly extending protrusions into the at least two recesses.

17. A method according to claim 15 wherein the method does not comprise moving any part of the locking device relative to any other part of the locking device when installing the locking device in or removing the locking device from the aircraft.

18. A method according to claim 15 wherein the main body of the locking device has a trapezoid shape and a plurality of apertures therethrough, and the step of inserting at least two outwardly extending protrusions of the 463L pallet into corresponding at least two recesses of the locking device comprising gripping the main body through the recesses.

19. A method according to claim 15 wherein the notches have a notch depth generally orthogonal to the notch pitch and the at least two rail locks are inserted into the corresponding at least two notches parallel to the notch depth.

20. A method according to claim 19 wherein the aircraft is transported from a first location where the 463L pallet is disposed therein to a second location for removing the 463L pallet therefrom and further comprising the steps of retracting the at least two rail locks from the corresponding at least two notches and removing the locking device from the position substantially parallel to the floor for removal from the aircraft at the second location.

* * * * *